United States Patent
Bito et al.

(10) Patent No.: US 6,265,111 B1
(45) Date of Patent: Jul. 24, 2001

(54) NON-AQUEOUS ELECTROLYTE SECONDARY BATTERY

(75) Inventors: Yasuhiko Bito, Osaka; Toshitada Sato, Kadoma; Hiromu Matsuda, Hyogo; Yoshinori Toyoguchi, Yao; Yasushi Nakagiri, Kyotanabe; Hideharu Takezawa, Katano, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/598,206

(22) Filed: Jun. 21, 2000

Related U.S. Application Data

(63) Continuation of application No. PCT/JP99/05805, filed on Oct. 20, 1999.

(30) Foreign Application Priority Data

| Oct. 22, 1998 | (JP) | 10-300547 |
| Oct. 23, 1998 | (JP) | 10-302466 |
| Aug. 30, 1999 | (JP) | 11-244061 |
| Aug. 31, 1999 | (JP) | 11-246273 |
| Sep. 24, 1999 | (JP) | 11-270703 |

(51) Int. Cl.$^7$ .................................................. H01M 4/58
(52) U.S. Cl. ............... 429/231.95; 429/221; 429/218.1; 429/220; 429/223; 429/224
(58) Field of Search ................ 429/231.95, 220, 429/221, 223, 224, 231.1, 231.5, 231.6, 218.1

(56) References Cited

U.S. PATENT DOCUMENTS

| 4,048,395 | * | 9/1977 | Lai | 429/112 |
| 5,536,600 | * | 7/1996 | Kaun | 429/223 |
| 5,770,333 |   | 6/1998 | Saito et al. | |

FOREIGN PATENT DOCUMENTS

| 63-274058 | 11/1988 | (JP) . |
| 63-274060 | 11/1988 | (JP) . |
| 05047381  | 2/1993  | (JP) . |
| 05082128  | 4/1993  | (JP) . |
| 07326342  | 12/1995 | (JP) . |
| 08078011  | 3/1996  | (JP) . |
| 09063651  | 3/1997  | (JP) . |
| 11086853  | 3/1999  | (JP) . |
| 11086854  | 3/1999  | (JP) . |

OTHER PUBLICATIONS

Kepler et al., Copper–tin anodes for rechargeable lithium batteries: an example of the matrix effect in an intermetallic system, Journal or Power Sources, vol. 81, Issue 81–82, pp. 383–387, Sep. 1999.*

* cited by examiner

Primary Examiner—Carol Chaney
Assistant Examiner—Angela J. Martin
(74) Attorney, Agent, or Firm—Akin, Gump, Strauss, Hauer & Feld, L.L.P.

(57) ABSTRACT

A non-aqueous electrolyte secondary battery having an improved negative electrode is disclosed. The negative electrode comprises alloy particles having a composition represented by the formula:

$$Li_x M^1_a M^2 \qquad (1)$$

wherein $M^1$ represents at least one element selected from the element group $m^1$ consisting of Ti, Zr, V, Sr, Ba, Y, La, Cr, Mo, W, Mn, Co, Ir, Ni, Cu and Fe, $M^2$ represents at least one element selected from the element group $m^2$ consisting of Mg, Ca, Al, In, Si, Sn, Pb, Sb and Bi, $M^1$ and $M^2$ represent different elements each other, and wherein $0 \leq x \leq 10$, $0.1 \leq a \leq 10$, with the proviso that $2 \leq a \leq 10$ when $M^1$ is composed only of Fe, and having at least two phases which are different in composition each other.

12 Claims, 2 Drawing Sheets

NON-AQUEOUS ELECTROLYTE SECONDARY BATTERY

This Application is a continuation of PCT/JP99/05805 filed Oct. 20, 1999.

TECHNICAL FIELD

The present invention relates to a non-aqueous electrolyte secondary battery, particularly an improvement of a negative electrode which reversibly absorbs and desorbs lithium.

BACKGROUND ART

There have been various vigorous studies on a non-aqueous electrolyte secondary battery including lithium or a lithium compound as the negative electrode, because it is to be expected to offer a high voltage as well as a high energy.

To date, oxides and chalcogens of transition metals like $LiMn_2O_4$, $LiCoO_2$, $LiNiO_2$, $V_2O_5$, $Cr_2O_5$, $MnO_2$, $TiS_2$, $MoS_2$ and the like are known positive electrode active materials for non-aqueous electrolyte secondary batteries. Those compounds have a layered or tunneled structure that allows free intercalation and deintercalation of lithium ions. On the other hand, there are many previous studies on metallic lithium as the negative electrode active material. However, metallic lithium has a drawback that a deposition of lithium dendrites occurs on the surface of the electrode during charging, which reduces charge/discharge efficiency or causes internal short-circuiting due to contact between formed lithium dendrites and the positive electrode. As one measure for solving such drawback, the use of a lithium alloy such as lithium-aluminum alloy which not only suppresses the growth of lithium dendrites but also can absorb therein and desorb therefrom lithium as the negative electrode has been under investigation. However, the use of such lithium alloy has a drawback that repeated charge/discharge operation causes pulverization of the electrode, which in turn deteriorates the cycle life characteristics. At present, lithium ion batteries have been put into practical use that include as the negative electrode a graphite-based carbon material having excellent cycle life characteristics and safety capable of reversibly absorbing and desorbing lithium although smaller in capacity than the above-mentioned negative electrode active materials.

When the above-mentioned graphite material is used in a negative electrode, the practical capacity used thereof is 350 mAh/g which is a value near the theoretical capacity (372 mAh/g). Since the theoretical density is as low as 2.2 g/cc and the density further decreases when the graphite material is formed into a negative electrode sheet, use of metallic materials having higher capacity per volume as the negative electrode is desired.

However, problems arising when metallic materials are used as the negative electrode include pulverization caused by repeated expansion and contraction accompanying intercalation and deintercalation of lithium. Due to this pulverization, the reactivity of the active material lowers and charge/discharge cycle life shortens.

For solving these problems, there has been for example a suggestion for solving pulverization, intending to suppress expansion by means of stress relaxation of a phase not absorbing lithium even under charged condition (absorbing condition) in coexistence in one particle of a phase absorbing lithium and a phase not absorbing lithium (Japanese Laid-Open Patent Publication (JP-A) No. 11-86854). Further, there has been a suggestion in which two or more phases absorbing lithium are allowed to exist in one particle, intending to relax expansion due to change in structure during absorbing lithium of each phase for suppression of pulverization (JP-A No. 11-86853).

However, even a negative electrode material produced by utilizing these means causes pulverization of the active material along with progress of a charge/discharge cycle, thereby to increase cycle deterioration. The reason for this is hypothesized as follows. Namely, when a plurality of phases are present in an active material particle, even if releasing of expansion stress into the interface of phases is possible, non-uniformity in stress tends to occur in an active material particle along with increase in expansion coefficient of each phase. Therefore, pulverization occurs from some phases on which expansion stress is applied significantly, and this pulverized material liberates from the active material particle. Thus, pulverization of the active material progresses. When one phase is composed solely of an element easily forming an alloy with lithium, the pulverization as described above tends to occur more easily.

The object of the present invention is to provide a negative electrode for non-aqueous electrolyte secondary batteries having high electric capacity and excellent charge/discharge cycle life characteristics, in view of the above-described drawbacks.

The present invention provides a negative electrode for non-aqueous electrolyte secondary batteries satisfying high electric capacity and long cycle life at the same time by preventing pulverization accompanying expansion and contraction.

DISCLOSURE OF INVENTION

The non-aqueous electrolyte secondary battery of the present invention comprises a rechargeable positive electrode, a rechargeable negative electrode and a non-aqueous electrolyte, and the negative electrode comprises alloy particles having a composition represented by the formula:

$$Li_x M^1_a M^2 \qquad (1)$$

wherein $M^1$ represents at least one element selected from the element group $m^1$ consisting of Ti, Zr, V, Sr, Ba, Y, La, Cr, Mo, W, Mn, Co, Ir, Ni, Cu and Fe, $M^2$ represents at least one element selected from the element group $m^2$ consisting of Mg, Ca, Al, In, Si, Sn, Pb, Sb and Bi, $M^1$ and $M^2$ represent different elements each other, and wherein $0 \leq x \leq 10$, $0.1 \leq a \leq 10$, with the proviso that $2 \leq a \leq 10$ when $M^1$ is composed only of Fe, and at least two phases having different compositions are present in the afore-mentioned alloy.

It is preferable that the afore-mentioned at least two phases have compositions represented by the formula (2) and the formula (3), respectively:

$$M^3_c M^4 \qquad (2)$$

$$M^5_d M^6 \qquad (3)$$

wherein each of $M^3$ and $M^5$ represents at least one element selected from the element group $m^1$, each of $M^4$ and $M^6$ represents at least one element selected from the element group $m^2$, and wherein $0.25 \leq c < 3$, $1 \leq d \leq 10$ and $c < d$.

Herein, $M^1$ preferably represents at least one element selected from the group consisting of Ti, Zr, Mn, Co, Ni, Cu and Fe. $M^1$ represents most preferably at least one element selected from the group consisting of Ti, Cu and Fe which are elements having lowest electrochemical reactivity with lithium, among them. $M^2$ preferably represents at least one element selected from the group consisting of Al, Si and Sn. $M^2$ represents most preferably at least one element selected from the group consisting of Si and Sn which are elements having highest electrochemical reactivity with lithium, among them.

BEST MODE FOR CARRYING OUT THE INVENTION

Figure 1:
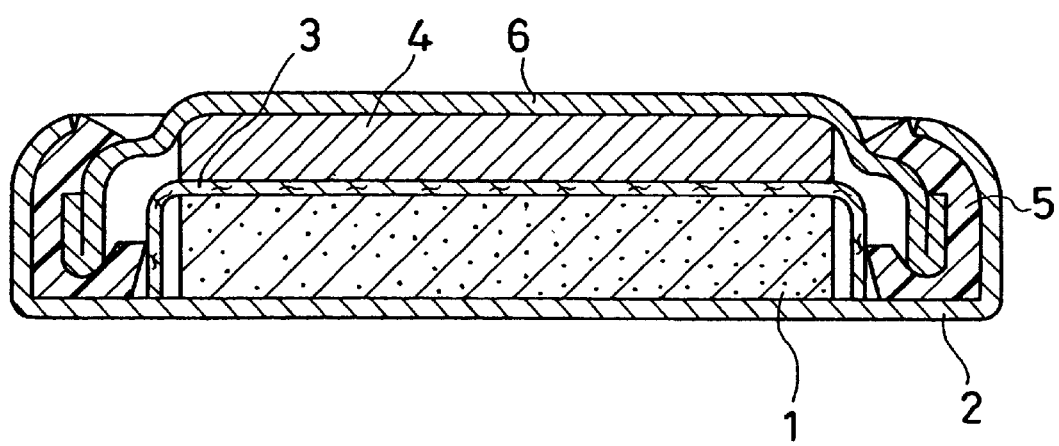
FIG. 1 is a schematic longitudinal section of a test cell for evaluating electrode characteristics of a negative electrode material of the present invention.

The negative electrode of the present invention comprises alloy particles having a composition represented by the formula:

$$Li_x M^1_a M^2 \qquad (1)$$

wherein $M^1$ represents at least one element selected from the element group $m^1$ consisting of Ti, Zr, V, Sr, Ba, Y, La, Cr, Mo, W, Mn, Co, Ir, Ni, Cu and Fe, $M^2$ represents at least one element selected from the element group $m^2$ consisting of Mg, Ca, Al, In, Si, Sn, Pb, Sb and Bi, $M^1$ and $M^2$ represent different elements each other, and wherein $0 \leq x \leq 10$, $0.1 \leq a \leq 10$, with the proviso that $2 \leq a \leq 10$ when $M^1$ is composed only of Fe, and having at least two phases different in composition each other.

The above-mentioned at least two phases preferably have compositions represented by the formula (2) and the formula (3), respectively:

$$M^3_c M^4 \qquad (2)$$

$$M^5_d M^6 \qquad (3)$$

wherein each of $M^3$ and $M^5$ represents at least one element selected from the element group $m^1$, each of $M^4$ and $M^6$ represents at least one element selected from the element group $m^2$, and wherein $0.25 \leq c \leq 3$, $1 \leq d \leq 10$ and $c < d$.

In the alloy particle constituting the negative electrode of the present invention, pulverization is suppressed by combination of a phase having a composition represented by the above-mentioned formula (2) (hereinafter referred to Phase A) with a phase having a composition represented by the above-mentioned formula (3) (hereinafter referred to Phase B), and as a result, deterioration due to charge/discharge cycles is suppressed. Phase A has a higher proportion of the element selected from the element group $m^2$, as compared with Phase B. The elements selected from the element group $m^2$ are metallic elements which tend to electrochemically react with lithium to form a uniform alloy, and higher ratio thereof indicates that the phase reacts with lithium in significant amount. Therefore, Phase A can absorb lithium in larger amount as compared with Phase B. Therefore, Phase A reveals larger expansion during charging. By coexistence of Phase B absorbing a smaller amount of lithium but showing also smaller expansion during charging with Phase A, the difference in expansion stresses of both phases can be decreased and cracking of the whole alloy particle can be prevented. On the other hand, when a phase inactive with lithium is combined with Phase A, only Phase A expands, and as a result, the difference in expansion stresses of both phases is large, and the particle tends to be cracked. By combination of Phase A with an inactive phase, the electric capacity decreases.

In the alloy particle of the present invention, the difference between expansion stresses of combined Phase A and Phase B is small so that expansion of the whole alloy particle is relaxed to give suppressed pulverization as compared with conventional examples, as described above. It is desirable that both of Phase A and Phase B in one particle are constituted of a plurality of crystal grains.

Preferable combination examples of Phase A with Phase B in the present invention will be listed below.

(a) Phase A is composed of one or more of $SrSn_3$, $BaSn_3$, $LaSn_2$, $ZrSn_2$, $MnSn_2$, $CoSn_2$ or $FeSn_2$, and Phase B is composed of one or more of $La_2Sn$, $Zr_3Sn_2$, $Zr_4Sn$, $V_3Sn$, $MnSn$, $Mn_2Sn$, $Mn_3Sn$, $FeSn$, $Fe_{1.3}Sn$, $Fe_3Sn$, $CoSn$, $Co_3Sn_2$, $Ni_3Sn_2$, $Ni_3Sn$, $Cu_6Sn_5$, $Cu_3Sn$, $Cu_4Sn$, $Ti_6Sn_5$ or $Ti_2Sn$.

(b) Phase A is composed of one or two of FeSn or CoSn, and Phase B is composed of one or more of $La_2Sn$, $Zr_3Sn_2$, $Zr_4Sn$, $V_3Sn$, $Mn_2Sn$, $Mn_3Sn$, $Fe_{1.3}Sn$, $Fe_3Sn$, $Co_3Sn_2$, $Ni_3Sn_2$, $Ni_3Sn$, $Cu_6Sn_5$, $Cu_3Sn$, $Cu_4Sn$, $Ti_6Sn_5$ or $Ti_2Sn$.

(c) Phase A is composed of one or two of $Ti_6Sn_5$ or $Cu_6Sn_5$, and Phase B is composed of one or more of $La_2Sn$, $Zr_3Sn_2$, $Zr_4Sn$, $V_3Sn$, $Mn_2Sn$, $Mn_3Sn$, $Ti_3Sn$, $Cu_3Sn$, $Fe_3Sn$, $Fe_6Sn$, $Fe_{12}Sn$, $Co_3Sn_2$, $Ni_3Sn_2$, $Ni_3Sn$, $Cu_4Sn$ or $Ti_2Sn$.

(d) Phase A is composed of one or more of $SrSn$, $Ba_2Sn$, $La_2Sn$ or $Ti_2Sn$, and Phase B is composed of one or more of $Mn_3Sn$, $Fe_3Sn$, $Fe_6Sn$, $Fe_{12}Sn$, $Ni_3Sn$, $Ni_6Sn$, $Cu_3Sn$, $Cu_4Sn$ or $Ti_3Sn$.

(e) Phase A is composed of one or more of $SrSi_2$, $BaSi_2$, $YSi_2$, $LaSi_2$, $TiSi_2$, $ZrSi_2$, $VSi_2$, $CrSi_2$, $MoSi_2$, $WSi_2$, $MnSi_2$, $CoSi_2$, $CuSi_2$, $FeSi_2$ or $NiSi_2$, and Phase B is composed of one or more of TiSi, $Ti_5Si_3$, ZrSi, $V_3Si$, CrSi, $Cr_2Si$, $Mo_3Si$, $W_3Si_2$, MnSi, $Mn_5Si_3$, $Mn_3Si$, FeSi, $Fe_5Si_3$, $Fe_3Si$, CoSi, $Co_2Si$, $Co_3Si$, NiSi, $Ni_3Si_2$, $Ni_2Si$, CuSi, $Cu_6Si_5$, $Cu_3Si$ or $Cu_4Si$.

(f) Phase A is composed of one or more of BaSi, TiSi, ZrSi, CrSi, MnSi, FeSi, CoSi, NiSi or CuSi, and Phase B is composed of one or more of $Ti_5Si_3$, $V_3Si$, $Cr_2Si$, $Mo_3Si$, $W_3Si_2$, $Mn_5Si_3$, $Mn_3Si$, $Fe_5Si_3$, $Fe_3Si$, $Co_2Si$, $Co_3Si$, $Ni_3Si_2$, $Ni_2Si$, $Cu_6Si_5$, $Cu_3Si$ or $Cu_4Si$.

(g) Phase A is composed of one or more of $Ti_5Si_3$, $W_3Si_2$, $Mn_5Si_3$, $Fe_5Si_3$ or $Cu_6Si_5$, and Phase B is composed of one or more of $V_3Si$, $Cr_2Si$, $Mo_3Si$, $Mn_3Si$, $Fe_3Si$, $Co_2Si$, $Co_3Si$, $Ni_2Si$, $Cu_3Si$ or $Cu_4Si$.

(h) Phase A is composed of one or more of SrSi, $Cr_2Si$, $Co_2Si$ or $Cu_4Si$, and Phase B is composed of one or more of $V_3Si$, $Mo_3Si$, $Mn_3Si$, $Fe_3Si$, $Co_3Si$, $Cu_3Si$ or $Cu_4Si$.

(i) Phase A is composed of one or more of $SrAl_4$, $BaAl_4$, $BaAl_2$, $LaAl_4$, $LaAl_2$, $TiAl_3$, $ZrAl_3$, $ZrAl_2$, $VAl_3$, $V_5Al_8$, $CrAl_4$, $MoAl_3$, $WAl_4$, $MnAl_4$, $MnAl_3$, $Co_2Al_5$, $CuAl_2$, $FeAl_3$, $FeAl_2$, $NiAl_3$ or $Ni_2Al_3$, and Phase B is composed of one or more of SrAl, BaAl, LaAl, $La_3Al_2$, TiAl, ZrAl, $Zr_2Al$, $MO_3Al$, MnAl, FeAl, $Fe_3Al$, CoAl, NiAl, CuAl or $Cu_4Al_3$.

(j) Phase A is composed of one or more of SrAl, BaAl, LaAl, TiAl, ZrAl, MnAl, FeAl, CoAl, NiAl or CuAl, and Phase B is composed of one or more of $La_3Al_2$, $Zr_2Al$, $Mo_3Al$, $Fe_3Al$ or $Cu_4Al_3$.

The alloy particle of the present invention is preferably composed of 20 to 80 atomic % of Phase A, 80 to 20 atomic % of Phase B and 0 to 50 atomic % of other phases. As the third phase, there is for example a single phase composed only of one element selected from the element group $m^2$ (hereinafter referred to Phase C). Phase C causes no problem in battery performance provided that the amount thereof is not more than 10 atomic % in the alloy. The proportion of Phase C is more desirably 5 atomic % or less. Other phases comprising an element selected from the element group $m^1$ may be present.

It is preferable that any one of Phase A and Phase B is dispersed in the form of islands in the matrix of other phase or both of Phase A and Phase B are constituted of fine crystal grains. When the crystal grain is in the form of a needle, the above-mentioned suppressing of pulverization works more successfully. In this case, the crystal grain size is desirably 10 $\mu$m or less. The more preferable crystal grain size is 0.05 $\mu$m or more and 5 $\mu$m or less. When the crystal grain size is over 10 $\mu$m, the crystal grain itself collapses due to expansion stress in absorbing lithium, possibly causing pulverization. When the crystal grain is in the form of a needle, the aspect ratio is desirably 1.5 or more. When the crystal grain is in such a form, the difference of expansion stresses of Phase A and Phase B further decreases, and the effect for suppressing pulverization of the alloy particle increases.

It is preferable that the cross section of a crystal grain in Phase A and Phase B is $10^{-7}$ cm$^2$ or less. More preferably the cross section is $10^{-9}$ cm$^2$ or more and $10^{-8}$ cm$^2$ or less. The reason for this is that when the cross section of a crystal grain in Phase A and Phase B is over $10^{-7}$ cm$^2$, the crystal grain itself collapses due to expansion stress in absorbing lithium, and a possibility of pulverization increases.

It is more preferable that the above-mentioned negative electrode has a structure in which all or a part of Phase B is covered with Phase A. Owing to this structure, expansion stress of the alloy particle is suppressed more easily.

In a further preferable mode of the present invention, the alloy contains a phase having a composition represented by $M^7$. By this phase, the effect for suppressing pulverization increases. $M^7$ is a single element or a compound made of two or more elements selected from the above-mentioned element group $m^1$, and the content thereof is preferably from 10 to 50 atomic %, more preferably from 10 to 25 atomic % based on the total amount of whole particles. The elements in the element group $m^1$ are elements which do not easily react with lithium electrochemically, and due to the presence of them in the alloy, pulverization of the alloy particle due to expansion and contraction can be suppressed. The phase having a composition represented by $M^7$ is desirably constituted of a plurality of crystal grains. Further, the crystal grain size may advantageously be 10 $\mu$m or less, more preferably 0.05 $\mu$m or more and 5 $\mu$m or less. When the crystal grain size is over 10 $\mu$m, phases not involved in charge and discharge are present in significant amounts, leading to a negative electrode having a lower capacity. An alloy preferably has a structure in which all or a part of the surface of the phase having a composition represented by $M^7$ is coated with Phase A or Phase B. With this structure, expansion stress of the alloy particle is suppressed more easily.

If the compositions when Phase A and Phase B absorb maximum amounts of lithium are represented by $Li_y M^3_c M^4$ and $Li_z M^5_d M^6$ respectively, proportions thereof in respective alloys are represented by $w^1$ and $w^2$ in terms of atomic ratios and respective proportions of absorbed lithium are represented by $L^1 = y/(c+1)$ an $L^2 = z/(d+1)$ in terms of atomic ratios, then it is preferable that the average value of $L^1 \times w^1$ and $L^2 \times w^2$; namely $LW = \{(L^1 \times w^1) + (L^2 \times w^2)\}/2$ is 2 or less.

When the above-mentioned formulae are satisfied, expansion stresses of Phase A and Phase B are the smallest, and pulverization of an alloy particle is suppressed. When LW is over 2, expansion and contraction are not easily relaxed even if three phases, Phase A, Phase B and a phase having a composition represented by $M^7$ are present. When cycle life characteristics are more important even if the capacity of the battery decreases slightly, LW is preferably 1 or less.

In another preferable mode of the present invention, a negative electrode is constituted of an alloy particle in which at least 50% or more of the surface of the particle containing at least one phase having a composition represented by the formula $M^8_e M^9$ is covered with a phase having a composition represented by the formula $M^{10}_f M^{11}_g$. In the above-mentioned formulae, $0 \leq e \leq 5$ and, $g=1$ and $e \leq f$ or $g=0$, each of $M^8$ and $M^{10}$ represents at least one element selected from the element group $m^1$, each of $M^9$ and $M^{11}$ represents at least one element selected from the element group $m^2$, $M^8$ and $M^9$ represent different elements each other, and, $M^{10}$ and $M^{11}$ represent different elements each other. Formation of a surface phase represented by the formula $M^{10}_f M^{11}_g$ suppresses cracking on the surface of an alloy particle, thereby to suppress pulverization of the particle. When the surface phase of an alloy particle has lower activity with lithium than that of an inner phase, there is also an action to prevent formation of an organic film on the surface of the particle by direct reaction with an organic solvent in an electrolyte. By this, charge and discharge efficiency increases, enabling long cycle life.

Covering of 50% or more of the whole surface of an alloy particle with the above-described surface phase allows the above-mentioned action to show an effect. When the covering ratio is less than 50%, many active planes of the particle are brought to the surface of the particle, thereby to lower the above-described action and effect.

In an alloy particle wherein the concentration of at least one element selected from the element group $m^1$ decreases in gradient from the surface of the particle toward the inner portion, the effect for suppressing pulverization increases further since a continuous inclination from phases having lower activity with lithium to phases having higher activity with lithium is formed.

The inner phase, a phase having a composition represented by $M^8_e M^9$ gives excellent battery performances when a crystallite contained in the phase is as minute as possible. More specifically, the crystal grain size is advantageously not over 10 $\mu$m, and more preferably 0.01 $\mu$m or more and 1 $\mu$m or less. When the crystal grain size is smaller, grain boundary region between crystals increases, and lithium ions tend to move easily through the region. As a result, the reaction becomes uniform, and stable battery performances are obtained without a large load on a part of an alloy particle.

Also in the surface phase, a phase having a composition represented by $M^{10}_f M^{11}_g$, it is preferable that a crystallite contained in the phase is as minute as possible. More specifically, the crystal grain size is advantageously not over 10 $\mu$m, and more preferably 0.01 $\mu$m or more and 1 $\mu$m or less. Like the inner phase, when the crystal grain size is smaller, grain boundary region between crystals increases, and lithium ions tend to move easily through the region, and sufficient reaction throughout the inner phase becomes possible.

One preferable method for producing an alloy particle of the present invention is a gas atomizing method shown in the following example. However, a liquid quenching method, ion beam sputtering method, vacuum vapor deposition method, plating method, gas phase chemical reaction method, mechanical alloying method and the like can also be applied. The preferable method for producing a surface phase on an alloy particle includes a mechanical milling method and electroless plating method shown in the following examples. In addition, a mechanochemical method, CVD method, plasma method and the like can be applied.

When the diameter of an alloy particle used in a negative electrode of the present invention is over 45 $\mu$m, unevenness on the surface of the negative electrode increases, causing negative effects on battery performances since the thickness of a practical negative electrode sheet is about 80 $\mu$m. Particularly preferable particle size is 30 $\mu$m or less.

The negative electrode of the present invention preferably contains an electrically conductive agent in an amount of 1 to 50% by weight. More preferably, the amount is from 5 to 25% by weight. The electrically conductive agent is desirably a carbon material. The particularly desirable material is a graphite-based material.

The following examples further illustrate the present invention in detail. The present invention is not limited to such examples.

EXAMPLE 1

In this example, electrode characteristics of various alloys as negative electrode active material were evaluated. Alloys used in this example were synthesized by the following method.

First, various elements in the form of a block, plate or particle were mixed in a given ratio, before casting in an arc melting furnace. The resultant cast article was subjected to a gas atomizing method under an argon gas atmosphere to obtain an alloy particle. The diameter of a spray nozzle herein used is 1 mmφ, and the argon gas injection pressure was 100 kgf /cm². The resultant alloy particle was passed through a 45 μm mesh sieve to obtain particles having an average particle size of 28 μm.

The above-described particles were subjected to X-ray diffraction analysis to recognize a plurality of phases in each particle. This plurality of phases were classified into the above-mentioned Phase A, Phase B, Phase C and other phases which are shown in Table 1.

The above-described particles were also subjected to surface analysis by EPMA analysis to find that any alloy has a maximum crystallite size of 8 μm and an average crystallite size of 2.3 μm. The crystallite area of a phase satisfying the above-mentioned formula (2) or (3) is 5×10⁻⁸ cm² at maximum. In some of the above-mentioned alloy particles, phases composed solely of an element selected from the above-mentioned element group m² were observed. The composition ratio of such phases in the alloy was 5 atomic % or less based on the total amount. Content ratios are listed in Table 1.

To 7.5 g of each alloy particle, 2 g of a graphite powder is mixed as an electrically conductive agent, and 0.5 g of a polyethylene powder is mixed as a binder. 0.1 g of the mixture was molded under pressure into a disk having a diameter of 17.5 mm. For investigating characteristics of the electrode thus produced, a test cell shown in FIG. 1 was fabricated. In FIG. 1, numeral 1 designates a test electrode made of a molded mixture containing each alloy particle. This test electrode 1 is placed at the center of a case 2. A separator 3 made of a micro-porous polypropylene film is placed on the electrode 1, and an electrolyte solution was poured, then, the opening of the case 2 was closed with a sealing plate 6 having an inner surface adhered with a metallic lithium disk of 17.5 mm in diameter and a periphery portion equipped with a polypropylene gasket 5. The test cell is thus constituted. The electrolyte solution herein used was prepared by dissolving 1 mol/liter of lithium perchlorate (LiClO₄) into a mixed solvent of ethylene carbonate with dimethoxymethane at a volume ratio of 1:1.

In this test cell, the electrode was subjected to cathode polarization (corresponding to charging when the test electrode is regarded as the negative electrode) at a constant current of 0.5 mA until the electrode potential became 0 V vs. the lithium counter electrode, then, the electrode was subjected to anode polarization (corresponding to discharging) until the electrode potential became 1.5 V. These cathode polarization and anode polarization were repeated.

Initial discharge capacities of 1 g of respective alloys are compared in Table 1. The cathode polarization and anode polarization were repeated 10 cycles, then, the test electrode was removed from the cell and observed, to find no deposition of metallic lithium on the surface of the electrode made of any alloy. From these results, no generation of dendrites was recognized in the alloy active material for a negative electrode in the present example. Moreover, the test electrode after the cathode polarization was subjected to ICP analysis, to find that x in the formula (1) relating to the amount of lithium contained in the alloy did not exceed 10.

Figure 2:
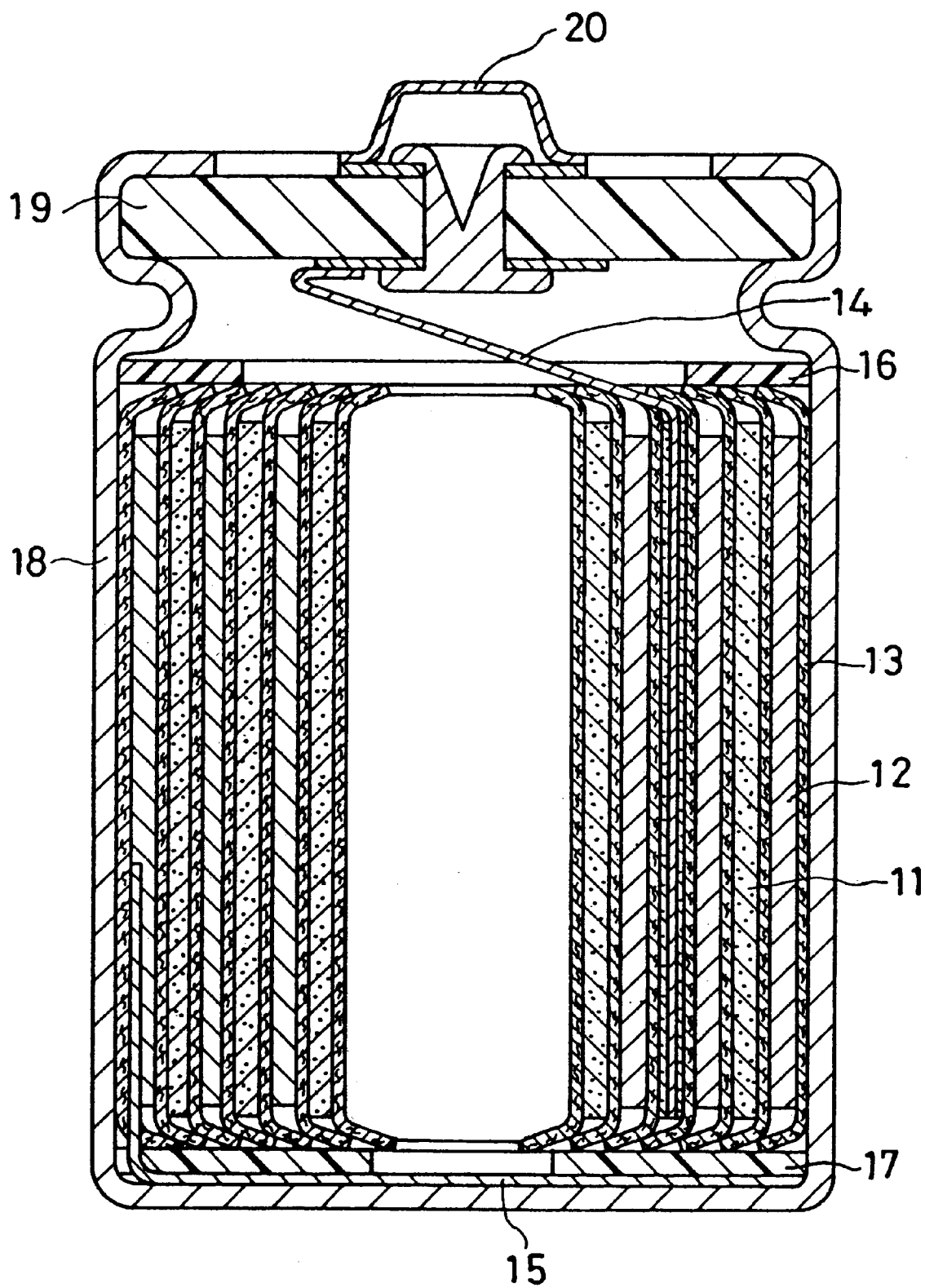
FIG. 2 is a schematic longitudinal section of a cylindrical battery for evaluating characteristics of a battery equipped with a negative electrode of the present invention.

Then, for evaluation of the cycle life characteristics of a battery made by using the above-mentioned alloy as the negative electrode, a cylindrical battery as shown in FIG. 2 was produced in accordance with the following procedure.

A positive electrode active material $LiMn_{1.8}Co_{0.2}O_4$ was synthesized by mixing $Li_2CO_3$, $Mn_3O_4$ and $CoCO_3$ at a given molar ratio and heating the mixture at 900° C. The resultant was classified to obtain a positive electrode active material of 100 mesh or less.

To 100 g of the positive electrode active material, 10 g of a carbon powder as an electrically conductive agent and an aqueous dispersion of polytetrafluoroethylene as a binder (resin content: 8 g) were added to prepare a paste which was applied on a titanium core member, and subsequently dried and rolled to obtain a positive electrode plate.

A negative electrode was produced by mixing each alloy particle, a graphite powder as an electrically conductive agent, and polytetrafluoroethylene as a binder at a ratio by weight of 70:20:10, rendering the mixture into a paste using a petroleum-based solvent, applying the paste on a copper core member, then, drying this at 100° C. A porous polypropylene film was used as a separator.

A positive electrode plate 11 on which a positive electrode lead 14 made of the same material as that of the core member was fixed by spot welding, a negative electrode plate 12 on which a negative electrode lead 15 likewise made of the same material as that of the core member was fixed by spot welding, and a band-like separator 13 having larger width than both electrodes inserted between both electrodes, were spirally rolled up to form an electrode group. This electrode group was inserted into a battery case 18 while placing polypropylene insulating plates 16 and 17 to the top and the bottom thereof, a step portion was formed on the upper part of the case 18, then, the same electrolyte solution as described above was poured into the case, and the case was sealed with a sealing plate 19 having a positive electrode terminal 20.

The battery constituted as described above was subjected to a charge and discharge cycle test at a temperature of 30° C., at a charge and discharge current of 1 mA/cm², and a charge and discharge voltage in the range from 4.3 V to 2.6 V, and discharge capacities at 2nd cycle and the capacity maintenance rates at 100th cycle against the discharge capacity at 1st cycle were measured. The results are shown in table 1.

TABLE 1

| No. | Alloy composition | Phase A | Phase B | Phase C | Other phase (at %) | Initial discharge capacity (mAh/g) | Capacity maintenance rate (%) |
|---|---|---|---|---|---|---|---|
| 1 | CoSn | $CoSn_2$ | CoSn | — | — | 770 | 75 |
| 2 | $CoSn_2$ | $CoSn_2$ | CoSn | Sn(5) | — | 860 | 69 |
| 3 | MnSn | $MnSn_2$ | $Mn_2Sn$ | — | — | 690 | 81 |

TABLE 1-continued

| No. | Alloy composition | Phase A | Phase B | Phase C (at %) | Other phase | Initial discharge capacity (mAh/g) | Capacity maintenance rate (%) |
|---|---|---|---|---|---|---|---|
| 4 | Mn$_2$Sn | MnSn$_2$ | Mn$_2$Sn,Mn$_3$Sn | — | — | 590 | 94 |
| 5 | Mn$_2$Sn$_3$ | MnSn$_2$ | Mn$_2$Sn | Sn(8) | — | 780 | 77 |
| 6 | ZrSn | ZrSn$_2$ | Zr$_4$Sn | — | — | 700 | 80 |
| 7 | LaNi$_2$Sn | LaSn$_2$ | Ni$_3$Sn$_2$,Ni$_3$Sn | — | — | 450 | 96 |
| 8 | NiSn | Ni$_3$Sn$_4$ | Ni$_3$Sn | Sn(2) | — | 520 | 94 |
| 9 | NiCoSn | NiCoSn | Ni$_3$Sn | Sn(2) | — | 550 | 94 |
| 10 | Fe$_5$Sn$_2$ | FeSn | Fe$_3$Sn | Sn(2) | — | 480 | 95 |
| 11 | FeMnSn$_2$ | FeSn$_2$ | Fe$_2$Sn,Mn$_3$Sn | — | — | 520 | 87 |
| 12 | Ti$_3$Sn$_2$ | Ti$_6$Sn$_5$ | Ti$_2$Sn,Ti$_3$Sn | — | — | 640 | 89 |
| 13 | TiSn | Ti$_6$Sn$_5$ | Ti$_2$Sn | Sn(5) | — | 850 | 81 |
| 14 | Cu$_3$Sn$_2$ | Cu$_6$Sn$_5$ | Cu$_3$Sn | — | — | 670 | 95 |
| 15 | CuSn | Cu$_6$Sn$_5$ | Cu$_3$Sn | Sn(6) | — | 720 | 86 |
| 16 | FeCuSn | Cu$_6$Sn$_5$ | Cu$_3$Sn,Fe$_6$Sn | — | — | 650 | 82 |
| 17 | Fe$_2$CuSn | Cu$_6$Sn$_5$ | Cu$_3$Sn,Fe$_{12}$Sn | — | — | 580 | 87 |
| 18 | Fe$_3$CuSn | Cu$_6$Sn$_5$ | Cu$_3$Sn | — | Fe$_{18}$Sn | 520 | 93 |
| 19 | TiFeSn | Ti$_6$Sn$_5$ | Ti$_3$Sn,Fe$_6$Sn | — | — | 600 | 91 |
| 20 | Ti$_2$Sn | Ti$_2$Sn | Ti$_3$Sn | — | — | 630 | 96 |
| 21 | Ti$_{1.8}$Sn | Ti$_2$Sn | Ti$_3$Sn | Sn(4) | — | 690 | 94 |
| 22 | CoMnSn | CoSn | Mn$_3$Sn | Sn(3) | — | 570 | 89 |
| 23 | VCu$_2$Sn | V$_2$Sn | Cu$_4$Sn | — | — | 530 | 91 |
| 24 | VSi | VSi$_2$ | V$_2$Si | — | — | 740 | 84 |
| 25 | TiSi | TiSi$_2$ | TiSi,Ti$_5$Si$_3$ | — | — | 710 | 90 |
| 26 | Zr$_{0.8}$Si | ZrSi$_2$ | ZrSi | Si(4) | — | 700 | 85 |
| 27 | V$_3$Si$_2$ | VSi$_2$ | V$_3$Si | — | — | 640 | 89 |
| 28 | MnSi | MnSi$_2$ | MnSi,Mn$_3$Si | — | — | 660 | 87 |
| 29 | Fe$_3$Si$_2$ | FeSi$_2$ | FeSi,Fe$_3$Si | Si(2) | — | 630 | 92 |
| 30 | CoSi | CoSi$_2$ | CoSi,Co$_2$Si | Si(2) | — | 650 | 88 |
| 31 | Co$_3$Si$_2$ | CoSi$_2$ | CoSi,Co$_2$Si,Co$_3$Si | — | — | 570 | 93 |
| 32 | NiSi | NiSi$_2$ | NiSi | Si(4) | — | 730 | 78 |
| 33 | Ni$_2$Si | NiSi$_2$ | NiSi,Ni$_3$Si$_2$ | — | — | 510 | 89 |
| 34 | Ti$_2$BaSi$_2$ | BaSi,TiSi | Ti$_5$Si$_3$ | — | — | 580 | 87 |
| 35 | Ti$_2$Si | TiSi | Ti$_5$Si$_3$ | Si(4) | — | 620 | 84 |
| 36 | Co$_2$Si | CoSi | Co$_2$Si | Si(1) | — | 600 | 89 |
| 37 | Fe$_2$Si | FeSi | Fe$_5$Si$_3$ | — | — | 490 | 92 |
| 38 | FeMoSi | FeSi | Mo$_3$Si | Si(2) | — | 510 | 89 |
| 39 | Mn$_2$Si | MnSi | Mn$_5$Si$_3$,Mn$_2$Si | — | — | 480 | 93 |
| 40 | Mn$_3$Si | Mn$_5$Si$_3$ | Mn$_3$Si | — | — | 440 | 96 |
| 41 | Co$_3$Si | Co$_2$Si | Co$_3$Si | Si(3) | — | 520 | 93 |
| 42 | NiCoAl$_3$ | NiAl$_4$,CoAl$_2$ | CoAl | — | — | 770 | 75 |
| 43 | CoAl$_2$ | CoAl$_2$ | CoAl,Co$_3$Al$_2$ | — | — | 680 | 77 |
| 44 | CuAl$_2$ | CuAl$_2$ | CuAl,Cu$_4$Al$_3$ | — | — | 720 | 75 |
| 45 | FeAl$_2$ | FeAl$_3$ | FeAl | — | — | 780 | 72 |
| 46 | TiAl$_3$ | TiAl$_3$ | TiAl | Al(5) | — | 750 | 78 |
| 47 | MnAl$_3$ | MnAl$_4$ | MnAl | — | — | 700 | 74 |
| 48 | LaAl$_2$ | LaAl | La$_3$Al$_2$ | — | — | 620 | 83 |
| 49 | FeAl | FeAl | Fe$_3$Al | Al(4) | — | 630 | 84 |
| 50 | CuAl | CuAl | Cu$_4$Al$_3$ | Al(3) | — | 650 | 81 |

For comparison, batteries were produced by using a particle composed of a Sn single substance and an Al single substance (average particle size: 26 μm, average crystallite size: 15 μm), a particle composed only of a Cu$_6$Sn$_5$ phase, a particle composed only of a FeAl phase (in each case, average particle size is 28 μm, an average crystallite size is 2.1 μm), a particle composed of Mg$_2$Ge phase-Mg phase (average particle size: 25 μm, average crystallite size: 3.2 μm, Mg$_2$Ge/Mg=7/3 (by atom)), a particle composed of Mg$_2$Sn phase-Mg phase (average particle size: 27 μm, average crystallite size: 5.3 μm, Mg$_2$Sn/Mg=8/2 (by atom)) and a particle composed of Mg$_2$Sn phase-Sn phase (average particle size: 27 μm, average crystallite size: 5.3 μm, Mg$_2$Sn/Sn=7/3 (by atom)), and discharge capacities at 2nd cycle and the capacity maintenance rates at 100th cycle against the discharge capacity at 1st cycle of the battery were measured and are shown in table 2.

TABLE 2

| Alloy composition | Phase A | Phase B | Phase C (at %) | Other phase | Initial discharge capacity (mAh/g) | Capacity maintenance rate (%) |
|---|---|---|---|---|---|---|
| Sn | — | — | Sn(100) | — | 620 | 12 |
| Al | — | — | Al(100) | — | 730 | 5 |
| Cu$_6$Sn$_5$ | Cu$_6$Sn$_5$ | — | — | — | 550 | 34 |
| FeAl | FeAl | — | — | — | 600 | 29 |

TABLE 2-continued

| Alloy composition | Phase A | Phase B | Phase C (at %) | Other phase | Initial discharge capacity (mAh/g) | Capacity maintenance rate (%) |
|---|---|---|---|---|---|---|
| $Mg_2Ge$—Mg | $Mg_2Ge$ | — | — | Mg | 530 | 22 |
| $Mg_2Sn$—Mg | $Mg_2Sn$ | — | — | Mg | 490 | 33 |
| $Mg_2Sn$—Sn | $Mg_2Sn$ | — | Sn(30) | — | 650 | 20 |

Batteries produced by using alloy active materials of the present invention as the negative electrode showed remarkably high capacity and improved cycle life characteristics as compared with comparative examples.

EXAMPLE 2

Powders or blocks of elements constituting a negative electrode alloy material were placed in a melting bath at given charging ratio, then, melted by heating, the melted substance was quenched by a roll quenching method for solidification. The obtained solidified substance was ground by a ball mill, and classified by a sieve to obtain alloy particles having a particle size of 45 µm or less.

It was confirmed that these alloys are constituted of at least three phases by electron microscope observation, element analysis and X-ray structure analysis. It was also found that phases were present in ratios as shown in Table 3.

The above-mentioned alloys were also subjected to surface analysis in accordance with EPMA analysis, to find that any alloy had a maximum crystallite size of 7 µm and an average crystallite size of 2.0 µm. The phase satisfying the above-mentioned formulae (2), (3) and (4) had a maximum crystallite area of $3 \times 10^{-8}$ $cm^2$. In some alloy particles, a phase is observed composed only of an element selected from the above-mentioned element group $m^2$, and the composition ratio of these phases was 5 atomic % or less based on the total amount.

The electrode characteristics as the negative electrode active material were evaluated by a test cell as shown in FIG. 1 in the same manner as in Example 1. The initial discharge capacities per 1 g of each alloy are shown in Table 3. The cathode polarization and the anode polarization were repeated for 10 cycles, then, the test cell was disassembled, the test electrodes were removed and observed, to find no deposition of metallic lithium on the surface of the electrode made of any alloy. From these results, no generation of dendrites was recognized in the alloy active material for a negative electrode in the present example. Furthermore, the test electrode after the cathode polarization was subjected to ICP analysis, to find that x in the formula (1) relating to the amount of lithium contained in the alloy did not exceed 10.

Cylindrical batteries using the above-mentioned alloys as the negative electrode were produced in the same manner as in Example 1, and the cycle life characteristics were evaluated under the same conditions. The results are shown in Table 3.

Batteries produced by using active materials of the present invention as the negative electrode showed remarkably high capacity and improved cycle life characteristics as compared with comparative examples shown in Table 2.

TABLE 3

| No. | Alloy composition | Phase A | Phase B | Phase C (at %) | Other phase | Initial discharge capacity (mAh/g) | Capacity maintenance rate (%) |
|---|---|---|---|---|---|---|---|
| 51 | $Fe_2Sn$ | $FeSn_2$ | $FeSn,Fe_3Sn$ | — | Fe | 610 | 94 |
| 52 | $Co_2Sn$ | $CoSn_2$ | CoSn | — | Co | 630 | 91 |
| 53 | $Mn_{2.5}Sn$ | $MnSn_2$ | $Mn_2Sn,Mn_3Sn$ | — | Mn | 550 | 97 |
| 54 | $FeMnSn_2$ | $FeSn_2,MnSn_2$ | $FeSn,Mn_2Sn$ | — | Fe | 740 | 81 |
| 55 | $NiFeSn_2$ | $NiSn_2$ | FeSn | — | Fe | 630 | 79 |
| 56 | $CoCu_3Sn$ | $CoSn_2$ | $Cu_3Sn$ | — | Cu | 440 | 97 |
| 57 | $Mn_2FeSn_2$ | $Mn_2Sn$ | $Fe_3Sn$ | — | Mn | 710 | 89 |
| 58 | NiSi | $NiSi_2$ | $Ni_5Si_3$ | — | Ni | 580 | 91 |
| 59 | $Mo_3Si_2$ | $MoSi_2$ | $Mo_3Si$ | — | Mo | 620 | 88 |
| 60 | $W_2Si$ | $WSi_2$ | $W_3Si_2$ | — | W | 520 | 94 |
| 61 | FeSi | $FeSi_2$ | $FeSi,Fe_5Si_3$ | Si(1) | Fe | 590 | 94 |
| 62 | CuSi | $CuSi_2$ | $Cu_6Si_5$ | — | Cu | 660 | 85 |
| 63 | VFeSi | VSi | $Fe_5Si_3$ | — | V | 460 | 91 |

EXAMPLE 3

In this example, electrode characteristics as the negative electrode active material of alloys having a surface coating phase were evaluated.

Alloy active materials selected from Cu (particle), Co (particle), Mn (block), Ni (particle), Ti (block), Sn (particle), Si (particle) and Al (powder) were mixed at given combination and molar ratio, and the mixture was cast in an arc melting furnace. The resultant cast article was processed by a gas atomizing method to obtain spherical particles. These alloy particles were passed through a 45 µm sieve to obtain particles having an average particle size of 28 µm.

The above-mentioned particles were subjected to X-ray diffraction analysis, to find that any of the particle had a plurality of alloy phases or single phase, and a phase having a composition satisfying the above-mentioned formula (8) was present without fail. Further, the above-mentioned particles were subjected to EPMA analysis, to find that in any particle, the crystal grain size of a phase satisfying the above-mentioned formula (8) was 5 µm at maximum, and the average crystal grain size was 1.3 µm.

Production of the surface phase on the above-mentioned alloy particle was conduced in accordance with a method in which a Ni powder having an average particle size of 0.03 μm, Cu powder having an average particle size of 0.05 μm, Ti powder having an average particle size of 0.05 μm, or Mn powder having an average particle size of 0.1 μm was mixed, and a method in which Ni, Co or Cu was applied on the surface using a commercially available Ni electroless plating solution, Co electroless plating solution, or Cu electroless plating solution.

In the method of mixing a powder, the above-mentioned alloyl powder and the above-mentioned metal powder were mixed at a ratio of 10:1 (by weight), then, the mixture was allowed to roll by a planetary ball mill for 10 minutes to make the metal powder to deposit on the surface of the alloy particle.

In the plating method, above-mentioned alloy particles were placed in respective electroless plating bathes, and stirred at 50° C. for Ni, 70° C. for Co and 20° C. for Cu to accomplish plating for 30 minutes.

Particles carrying the above-mentioned surface phases produced were subjected to given heat treatment, to cause diffusion from the surface phase to the inner phase of a metallic element constituting the surface layer, forming an inclination in concentration so that the concentration of the metallic element decreases from the surface to the inner portion. In this procedure, the heat treatment was conducted under argon atmosphere, and heating up to given treating temperature was conducted in 3 hours, and this treating temperature was kept for 12 hours. The particles were left for cooling.

As a result, a surface phase as shown in Table 4 was obtained (in this table, a phase present on the outermost surface of a particle in largest amount is shown.). SEM photographs of sections of various particle were observed, to confirm that in all particles, the surface phase was present at a coating ratio of at least 50%.

The electrode characteristics as the negative active material of these alloy particles were evaluated in the test cell as shown in FIG. 1 in the same manner as in Example 1. The initial discharge capacities per 1 g of these active materials are shown in Table 4. Regarding all active materials, a test cell subjected to the cathode polarization and another test cell subjected to the cathode polarization and the anode polarization repeated for 10 cycles were disassembled and the test electrodes were removed and observed. The result was that there was no deposition of metallic lithium on the surface of the electrodes. From these results, no generation of dendrites was recognized in the negative electrode active material in the present example. Further, the test electrode after the cathode polarization was subjected to ICP analysis, to find that x in the formula (1) relating to the amount of lithium contained in the alloy did not exceed 10.

Then, for evaluation of the cycle life characteristics of a battery made by using the above-mentioned alloy as the negative electrode, a cylindrical battery as shown in FIG. 2 was produced in accordance with the same method as in Example 1.

These batteries were subjected to a charge and discharge cycle test at a temperature of 30° C., at a charge and discharge current of 1 mA/cm$^2$, and a charge and discharge voltage in the range from 4.3 V to 2.6 V. Discharge capacities at 2nd cycle and capacity maintenance rates at 200th cycle against the discharge capacity at 1st cycle are shown in table 4.

TABLE 4

| Alloy particle | Inner phase | Surface treatment | Heat treatment | Surface phase | Initial discharge capacity (mAh/g) | Capacity maintenance rate (%) |
|---|---|---|---|---|---|---|
| NiSi$_2$ | NiSi$_2$,Si | — | — | NiSi$_2$ | 720 | 68 |
| | | Ni(plating) | — | Ni | 690 | 91 |
| | | | 900° C. | NiSi | 680 | 95 |
| | | Ni(powder) | — | Ni | 690 | 93 |
| | | | 900° C. | Ni$_2$Si | 690 | 97 |
| Cu$_6$Sn$_5$ | Sn,Cu$_6$Sn$_5$ | — | — | Cu$_6$Sn$_5$ | 580 | 75 |
| | | Cu(powder) | — | Cu | 550 | 89 |
| | | | 400° C. | Cu$_3$Sn | 560 | 93 |
| | | Cu(plating) | — | Cu | 570 | 95 |
| | | | 400° C. | Cu$_3$Sn | 580 | 98 |
| | | Ni(powder) | — | Ni | 550 | 93 |
| | | | 700° C. | Cu$_2$NiSn | 590 | 99 |
| CoSn$_2$ | Sn,CoSn$_2$,CoSn | — | — | CoSn$_2$ | 770 | 82 |
| | | Co(plating) | — | Co | 740 | 95 |
| | | | 950° C. | Co$_3$Sn$_2$ | 750 | 97 |
| Ti$_2$Sn | Ti$_2$Sn | — | — | Ti$_2$Sn | 560 | 80 |
| | | Ti(powder) | — | Ti | 540 | 97 |
| | | | 1000° C. | Ti$_5$Sn | 540 | 99 |
| MnAl | MnAl$_4$,MnAl,Mn | — | — | MnAl | 490 | 77 |
| | | Mn(powder) | — | Mn | 450 | 93 |
| | | | 600° C. | Mn$_3$Al | 470 | 97 |

For comparison, discharge capacities at 2nd cycle and the capacity maintenance rates at 200th cycle against the discharge capacity at 1st cycle of batteries using alloy particles forming no surface phase formed are shown in table 4.

It is found that batteries produced by using active materials having surface phases show remarkably improved cycle life characteristics as compared with batteries using active materials having no surface phase as the negative electrode.

In the above-mentioned examples, the cylindrical batteries are explained, however, the form of the battery of the present invention is not limited to cylindrical, and secondary batteries in other forms such as a coin type, rectangular type, flat type and the like can be applied likewise. In the above examples, LiMn$_{1.8}$Co$_{0.2}$O$_4$ was used as the positive electrode active material, however, it is not to mention that active materials having reversibility for charging and discharging typically including LiMn$_2$O$_4$, LiCoO$_2$, LiNiO$_2$ and the like can be used.

INDUSTRIAL APPLICABILITY

As described above, in accordance with the present invention, non-aqueous electrolyte secondary batteries affording high energy density with high capacity and extremely excellent cycle life characteristics can be obtained.

What is claimed is:

1. A non-aqueous electrolyte secondary battery comprising a rechargeable positive electrode, a rechargeable negative electrode and a non-aqueous electrolyte, wherein said negative electrode comprises alloy particles having a composition represented by the formula:

$$Li_xM^1{}_aM^2 \qquad (1)$$

wherein $M^1$ represents at least one element selected from the element group $m^1$ consisting of Ti, Zr, V, Sr, Ba, Y, La, Cr, Mo, W, Mn, Co, Ir, Ni, Cu and Fe, $M^2$ represents at least one element selected from the element group $m^2$ consisting of Mg, Ca, Al, In, Si, Sn, Pb, Sb and Bi, $M^1$ and $M^2$ represent different elements from each other, and wherein $0 \leq x \leq 10$, $0.1 \leq a \leq 10$, with the proviso that $2 \leq a \leq 10$ when $M^1$ is composed only of Fe, and having at least two phases which are different in composition from each other.

2. The non-aqueous electrolyte secondary battery in accordance with claim 1, wherein said at least two phases have compositions represented by the formula (2) and the formula (3), respectively:

$$M^3{}_cM^4 \qquad (2)$$

$$M^5{}_dM^6 \qquad (3)$$

wherein each of $M^3$ and $M^5$ represents at least one element selected from said element group $m^1$, each of $M^4$ and $M^6$ represents at least one element selected from said element group $m^2$, and wherein $0.25 \leq c < 3$, $1 \leq d \leq 10$ and $c < d$.

3. The non-aqueous electrolyte secondary battery in accordance with claim 2, wherein a part or all of a phase having a composition represented by the formula (3) is covered with a phase having a composition represented by the formula (2) in said alloy.

4. The non-aqueous electrolyte secondary battery in accordance with claim 3, wherein said alloy further has a phase having a composition represented by the formula (4):

$$M^7 \qquad (4)$$

wherein $M^7$ represents a single element or a compound made of two or more elements selected from said element group $m^1$ and the proportion of this phase is from 10 to 50 atomic % based on the total amount of whole particles.

5. The non-aqueous electrolyte secondary battery in accordance with claim 4, wherein all or a part of the surface of a phase having a composition represented by said formula (4) is covered with a phase having a composition represented by the formula (2) or the formula (3).

6. The non-aqueous electrolyte secondary battery in accordance with claim 2, wherein when phases having compositions represented by said formula (2) and (3) absorb maximum amounts of lithium, if the compositions are represented by $Li_yM^3{}_cM^4$ and $Li_zM^5{}_dM^6$ respectively, proportions thereof in respective alloys are represented by $w^1$ and $w^2$ in terms of atomic ratios and respective proportions of absorbed lithium are represented by $L^1=y/(c+1)$ an $L^2=z/(d+1)$ in terms of atomic ratios, then $\{(L^1 \times w^1)+(L^2 \times w^2)\}/2$ is 2 or less.

7. The non-aqueous electrolyte secondary battery in accordance with claim 1, wherein said negative electrode is composed of alloy particles in which at least 50% or more of the surface of the particle containing at least one phase having a composition represented by the formula $M^8{}_eM^9$ is covered with a phase having a composition represented by the formula $M^{10}{}_fM^{11}{}_g$, and wherein in said formulae, $0 \leq e \leq 5$ and, $g=1$ and $e \leq f$ or $g=0$, each of $M^8$ and $M^{10}$ represents at least one element selected from said element group $m^1$, each of $M^9$ and $M^{11}$ represents at least one element selected from said element group $m^2$, $M^8$ represents a different element from $M^9$ and $M^{10}$ represents a different element from $M^{11}$.

8. The non-aqueous electrolyte secondary battery in accordance with claim 7, wherein the concentration of at least one element selected from said element group $m^1$ in said alloy particle decreases in gradient from the surface of the particle toward the inner portion.

9. The non-aqueous electrolyte secondary battery in accordance with claim 1, wherein the average size of the alloy particles constituting said negative electrode is 45 μm or less.

10. The non-aqueous electrolyte secondary battery in accordance with claim 1, wherein said negative electrode contains an electrically conductive agent in an amount of 1% by weight or more and 50% by weight or less.

11. A non-aqueous electrolyte secondary battery comprising a rechargeable positive electrode, a rechargeable negative electrode and a non-aqueous electrolyte, wherein said negative electrode comprises alloy particles having a composition represented by the formula:

$$Li_xM^1{}_aM^2 \qquad (1)$$

wherein $M^1$ represents at least one element selected from the element group $m^1$ consisting of Ti, Zr, V, Sr, Ba, Y, La, Cr, Mo, W, Mn, Co, Ir, Ni, and Cu, $M^2$ represents at least one element selected from the element group $m^2$ consisting of Mg, Ca, Al, In, Si, Sn, Pb, Sb and Bi, $M^1$ and $M^2$ represent different elements from each other, and wherein $0 \leq x \leq 10$ and $0.1 \leq a \leq 10$, and having at least two phases which are different in composition from each other.

12. A non-aqueous electrolyte secondary battery comprising a rechargeable positive electrode, a rechargeable negative electrode and a non-aqueous electrolyte, wherein said negative electrode comprises alloy particles having a composition represented by the formula:

$$Li_xM^1{}_aM^2 \qquad (1)$$

wherein $M^1$ represents at least one element selected from the element group $m^1$ consisting of Ti, Zr, V, Sr, Ba, Y, La, Cr, Mo, W, Mn, Co, Ir, Ni, Cu and Fe, $M^2$ represents at least one element selected from the element group $m^2$ consisting of Mg, Ca, Al, In, Sn, Pb, Sb and Bi, $M^1$ and $M^2$ represent different elements from each other, and wherein $0 \leq x \leq 10$, $0.1 \leq a \leq 10$, with the proviso that $2 \leq a \leq 10$ when $M^1$ is composed only of Fe, and having at least two phases which are different in composition from each other.

* * * * *